UNITED STATES PATENT OFFICE.

GEORGE CLARK WARR, OF LONDON, AND WILLIAM THOMAS WRIGHT, OF WRAYSBURY, ENGLAND.

PROCESS OF OBTAINING EDIBLE VEGETABLE OIL.

SPECIFICATION forming part of Letters Patent No. 692,743, dated February 4, 1902.

Application filed August 14, 1901. Serial No. 71,805. (No specimens.)

*To all whom it may concern:*

Be it known that we, GEORGE CLARK WARR, a citizen of the United States of America, residing at 13 Fenchurch avenue, London, and WILLIAM THOMAS WRIGHT, a subject of the King of Great Britain, residing at Ankerwyche Farm, Wraysbury, county of Buckingham, England, have invented certain new and useful Improvements in Methods of Manufacturing Edible Vegetable Fat, of which the following is a specification.

The object of this invention is to manufacture an edible vegetable fat from kernels of oil-retaining nuts in such manner that the product shall be of good color and taste, absolutely free from any objectionable or injurious matter, and be available for use as food—such, for example, as a substitute for butter, lard, and the like. In the methods of manufacturing such food from oil-producing nuts—for instance, cocoanut-oil—the usual form of process is to extract the oil as follows: The nut comes to the oil-mills in a dried form, termed "copra." This is very dry and hard, which during the process of drying has collected dirt and generated mildew, &c. This material is subjected to great pressure under edge-stones which pulverizes the kernel. It is then subjected to hydraulic pressure, and the crude oil thus obtained is sent to the market. In this state it is unfit for edible purposes; but it is sometimes treated with strong chemicals and refined to enable it to be used as a food produce, which at best is a poor substitute for inferior grades of butter, lard, or dripping.

Now according to our invention we take the cocoanut (*Cocos nucifera*) and remove the husks, shells, and cuticle. The kernel is disintegrated to pulverize it, such pulverized material being submitted to a suitable temperature of from 100° Fahrenheit for new nuts to 200° Fahrenheit for old nuts, the material being agitated and kept in the temperature a sufficient time to thoroughly render all parts of the same degree of heat and to open out or loosen the oil-cells, so that on the application of the material to a hydraulic or other press the oil will be completely pressed out and be allowed to run into a tank, where it is washed with water, the oil being agitated by mechanical or other appliances during the application of the water or by other means, so as to release the flocculent matter or any other impurities, and by repeating this operation as the state of the oil requires and with the addition of sodium chlorid or an equivalent precipitant to the last washing it will be found after allowing the contents of the vessel to stand a certain time that the released flocculent matter or other impurities and the water will settle in the tank and leave the oil bright and clear on the top, so that it can be decanted or drawn off. To further insure the oil being of a pure bright nature, it is then passed through a filter-press to filtrate the oil, the usual agents being employed, so that after it has passed through the press it is freed from all impurities.

The above operations are carried on in a temperature suitable to keep the oil in a fluid condition. By coloring and flavoring the oil or fat can be made to resemble butter, lard, dripping, and such like edible substances. On the removal of the oil or fat to the ordinary atmosphere it will congeal and become thick like butter, so as to form an edible product suitable for the market.

We have mentioned the cocoanut as deeming it more suitable to illustrate the process; but it must be understood that we can use any and every kind of oil-producing nut.

By this invention we are enabled to produce an edible product of great purity, good color, and of taste to resemble the substance it is intended as a substitute for.

What we claim, and desire to secure by Letters Patent, is—

1. The method of securing oil from oil-bearing nuts, which consists in separating the kernels and the nuts from their shells; pulverizing the kernel; submitting the pulverized kernels to a heat of from 100° to 200° Fahrenheit, depending on the age of the nuts, and finally in subjecting the pulverized kernels to pressure to express the oil therefrom.

2. The method of securing oil from oil-bearing nuts, which consists in separating the kernels and the nuts from their shells; pulverizing the kernel; submitting the pulverized kernels to a heat of from 100° to 200° Fahrenheit, depending on the age of the nuts; subjecting the pulverized kernels to pressure to express the oil therefrom, and finally in allowing the
5 oil to run into a suitable menstruum, whereby the grosser impurities in the oil are removed.

In testimony whereof we have hereunto set our hands in presence of two subscribing witnesses.

GEORGE CLARK WARR.
WILLIAM THOMAS WRIGHT.

Witnesses:
  PERCY E. MATTOCKS,
  HENRY NAYKELS.